(12) United States Patent
Oliviero

(10) Patent No.: US 6,186,715 B1
(45) Date of Patent: Feb. 13, 2001

(54) CARGO BAR WITH FORCE LIMITATION MECHANISM

(75) Inventor: Gian Carlo Oliviero, Caracas (VE)

(73) Assignee: Multiprens C.A., Caracass (VE)

( * ) Notice: Under 35 U.S.C. 154(b), the term of this patent shall be extended for 0 days.

(21) Appl. No.: 09/305,549

(22) Filed: May 5, 1999

(51) Int. Cl.[7] .................................................. B60P 7/15
(52) U.S. Cl. ...................... 410/151; 410/143; 410/149; 410/153
(58) Field of Search .................................... 410/143, 145, 410/149, 151, 153; 254/12, 95, 112; 211/105.3, 105.5, 105.6; 248/354.1, 354.6, 354.7; 74/167, 169, 141.5

(56) References Cited

U.S. PATENT DOCUMENTS

| | | | |
|---|---|---|---|
| 4,797,043 | 1/1989 | Williams, Jr. ......................... | 410/145 |
| 5,378,095 | * 1/1995 | Shultz .................................. | 410/151 |
| 5,443,342 | * 8/1995 | Huang .................................. | 410/151 |
| 5,769,580 | * 6/1998 | Purvis .................................. | 410/151 |
| 5,833,414 | * 11/1998 | Feldman et al. ..................... | 410/151 |
| 5,890,856 | * 4/1999 | Huang .................................. | 410/151 |
| 5,944,464 | * 8/1999 | Cole, Jr. .............................. | 410/153 |
| 5,988,963 | * 11/1999 | Shiau .................................. | 410/151 |

* cited by examiner

*Primary Examiner*—Stephen T. Gordon
(74) *Attorney, Agent, or Firm*—Shook, Hardy & Bacon LLP

(57) ABSTRACT

A cargo bar equipped with an adjustable mechanism for limiting the force that can be exerted by a ratchet that serves to secure the cargo bar in place extending between opposing surfaces of a truck body. The ratchet mechanism extends one of the two in-line bars of the cargo bar. The other bar is carried on a plunger. A compression spring is located between the plunger and ratchet housing to compress when the ratchet handle is reciprocated to wedge the cargo bar in place. A stop moves with the plunger to a position where the stop interferes with actuation of the ratchet handle when the spring has been compressed to an extent coincident with the desired maximum force. The stop is adjustable to vary the force limitation.

19 Claims, 4 Drawing Sheets

Fig. 7.
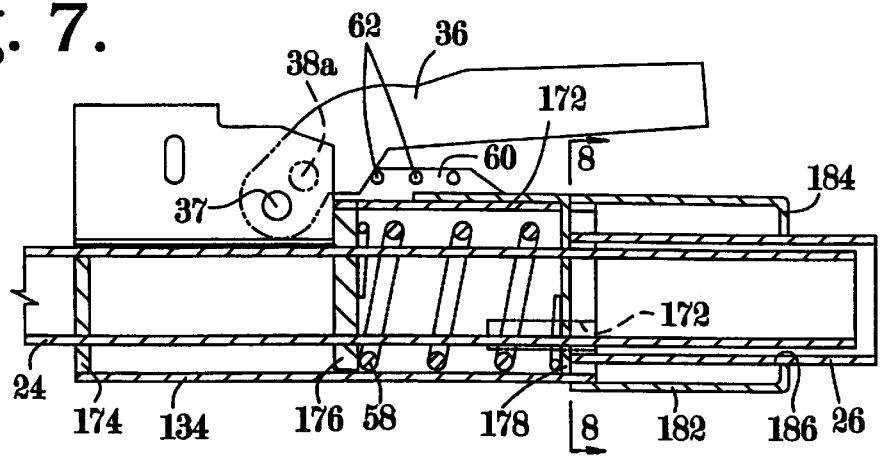
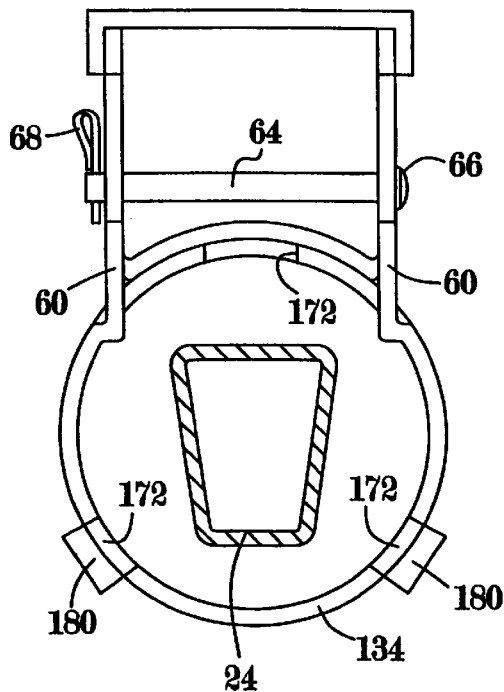
Fig. 8.
Fig. 10.
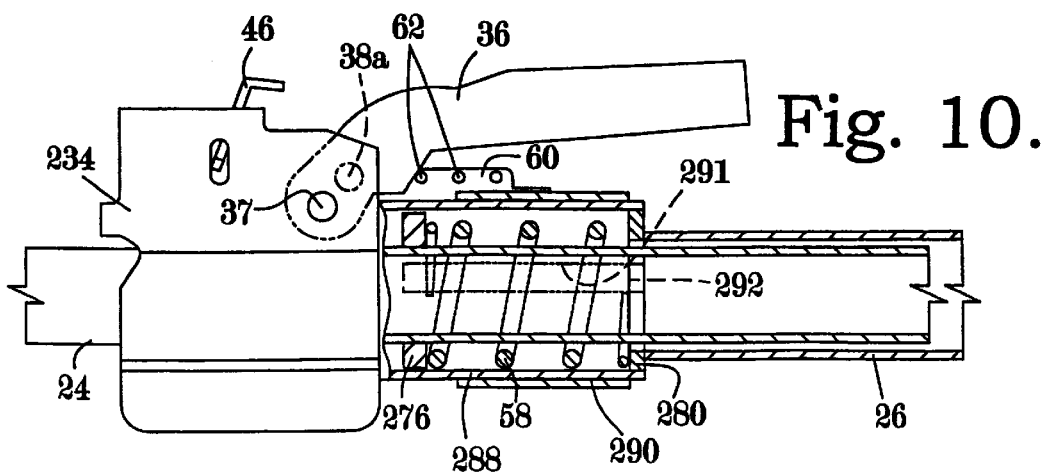

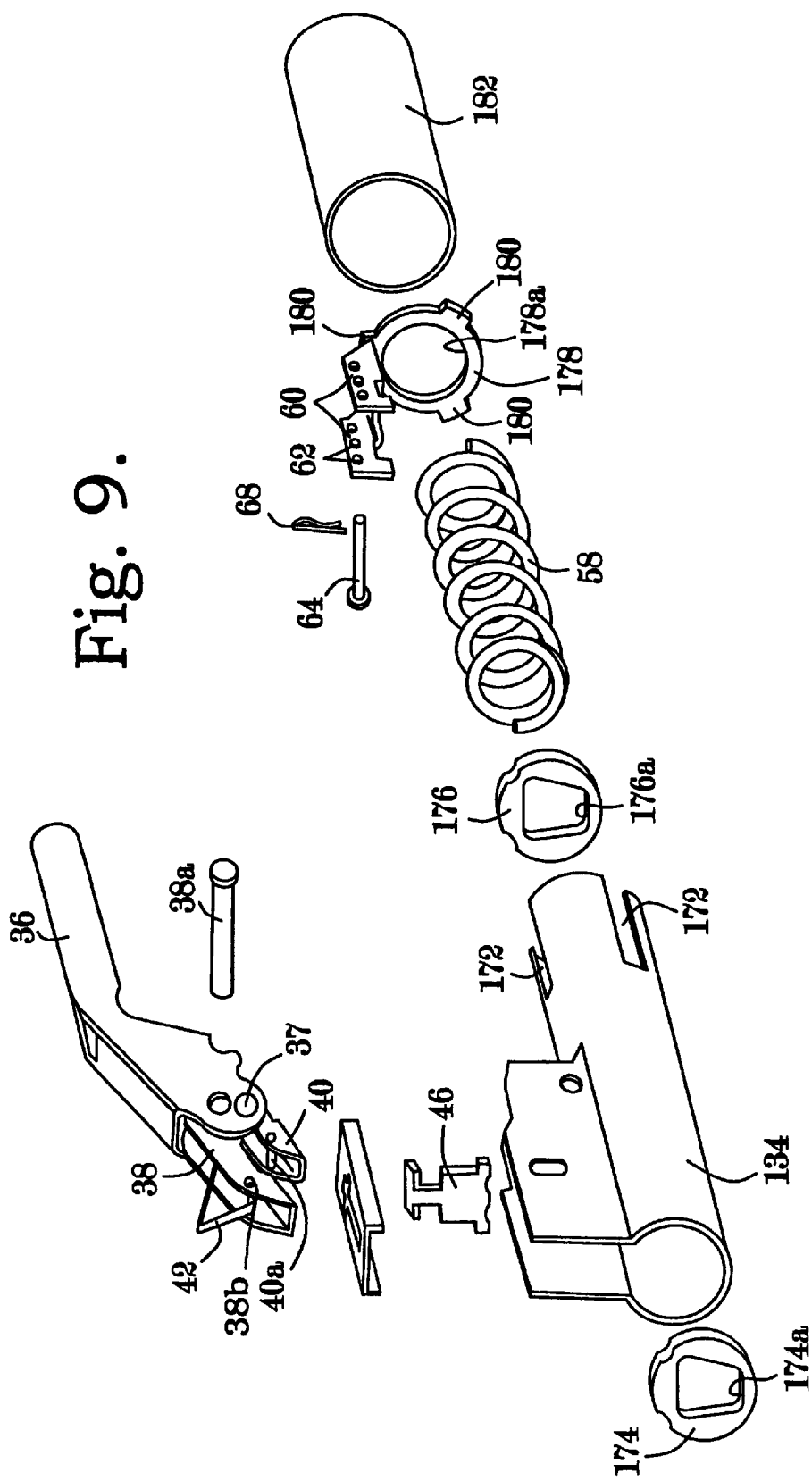

CARGO BAR WITH FORCE LIMITATION MECHANISM

FIELD OF THE INVENTION

This invention relates in general to the restraint of cargo and more particularly to cargo bars of the type used in truck bodies to prevent cargo from shifting while in transit.

BACKGROUND OF THE INVENTION

Various types of restraints have been used for restraining the loads which are carried in the trailers of large over-the-road trucks and semi-trailers. Shoring bars are often used in conjunction with tracks that are mounted on the opposite side walls of the truck or trailer body. Cargo bars that do not require tracks are also in widespread use. The cargo bar typically has pads on its opposite ends which bear against the truck walls (or the floor and ceiling) when a jack type ratchet mechanism is operated to lengthen the bar and wedge it in place. Often, a spring system known as a spring foot assembly is installed in the cargo bar to provide it with flexibility as the trailer walls flex. The need for a spring foot assembly increases the cost and complexity of the cargo bar construction.

One of the principal problems with cargo bars is that workers can operate the ratchet so aggressively that the cargo bar can apply excessive force to the trailer walls. At times, serious damage and even destruction of the truck walls can result. This can obviously lead to considerable cost and trouble. Hydraulic devices that have been used to apply the force have been provided with pressure relief systems that relieve the fluid pressure to avoid the application of excessive force. However, hydraulic systems are more complicated, costly, and difficult to use than mechanical cargo bars.

Another problem that has been encountered is that cargo bars can generally be used in only one orientation, with the ratchet handle projecting upwardly. At times, there is an advantage to orienting the cargo bar sideways with the handle projecting to the side for better access when applying and tightening the bar. In existing devices, the pawl of the ratchet mechanism drops to the side of the ratchet housing when the bar is positioned sideways. Then, the pawl cannot properly engage the teeth on the bar and cannot extend the bar as necessary for proper operation. For this reason, cargo bars are generally useful only in a position where the ratchet handle extends upwardly, and this is limiting as to accessibility of the handle.

SUMMARY OF THE INVENTION

The present invention is directed to a cargo bar which is improved in that it is equipped with a mechanical stop that prevents the bar from applying excessive force that could damage the truck walls.

It is a particular feature of the invention that the maximum force that can be exerted by the cargo bar is adjustable as desired. By way of example, the stop can have different settings that accommodate a light, medium, or heavy duty force application, or the stop can be removed altogether to avoid putting a limitation on the force in appropriate circumstances.

It is another object of the invention to provide a cargo bar that can be used in a sideways orientation to enhance the accessibility of the ratchet handle.

A further object of the invention is to provide a cargo bar of the character described that largely makes use of standard available components in order to provide an economical construction.

In accordance with one embodiment of the invention, a cargo bar includes a ratchet housing and a pair of bars that are arranged in line. One of the bars can be extended by operating a reciprocating ratchet handle. The other bar projects from a barrel which cooperates with the ratchet housing and is connected with it by a compression spring. After the bar has been extended between the walls of the truck body (or its floor and ceiling) and the handle is reciprocated additionally, the barrel and ratchet housing are forced closer together to compress the spring.

A pin which serves as a stop for the handle is fitted selectively in sets of holes that are formed in a bracket carried on the barrel. The stop pin thus moves with the barrel and is positioned to interfere with further operation of the ratchet handle when the spring has been compressed to a point selected according to which set of holes the pin is extended through. At this time, the mechanism is exerting the maximum selected force on the truck walls through the compression spring. Additional extension of the cargo bar is prevented by the stop pin which is positioned to prevent additional operation of the ratchet handle. Thus, damage to the truck walls due to excessive force is avoided.

By providing plural positions of the stop pin, the maximum force can be selected as desired, as among selections of light, medium and heavy duty settings, or any other selections that may be appropriate. At the same time, the pin can be removed to eliminate the force limitation altogether.

Other embodiments of the invention provide variations in the specific construction while operating the same in principle.

According to another aspect of the invention, the ratchet housing (or the side of the pawl which is adjacent to the ratchet housing) can be indented (or otherwise deformed) to provide a projection that keeps the pawl from falling against the side of the ratchet housing when the cargo bar is turned sideways. Consequently, the cargo bar can be used in a sideways position without the pawl dropping to a location where it is not able to interact properly with the teeth of the extension bar. This allows the cargo bar to exhibit increased flexibility and versatility because it can be used in a sideways orientation if necessary to provide convenient access to the ratchet handle.

The invention is characterized by a simple and economical construction that is attributable largely to the use of many standard components that are readily available. The spring foot assembly that is required in other cargo bars is not needed, and its expense can be avoided, because the compression spring used in the force limitation mechanism serves the function of allowing the cargo bar to flex with the truck walls for stability purposes.

Other and further objects of the invention, together with the features of novelty appurtenant thereto, will appear in the course of the following description.

BRIEF DESCRIPTION OF THE DRAWINGS

In the accompanying drawings which form a part of the specification and are to be read in conjunction therewith and in which like reference numerals are used to indicate like parts in the various views:

FIG. 7 is a fragmentary side elevational view of a cargo bar constructed according to a second embodiment of the present invention;

FIG. 8 is a fragmentary sectional view taken generally along line 8—8 of FIG. 7 in the direction of the arrows;

FIG. 9 is an exploded perspective view showing the force limiting mechanism included in the cargo bar of FIGS. 7 and 8; and FIG. 10 is a fragmentary elevational view of a cargo bar having a force limitation mechanism constructed according to a third embodiment of the invention.

DETAILED DESCRIPTION OF THE INVENTION

Figure 1:
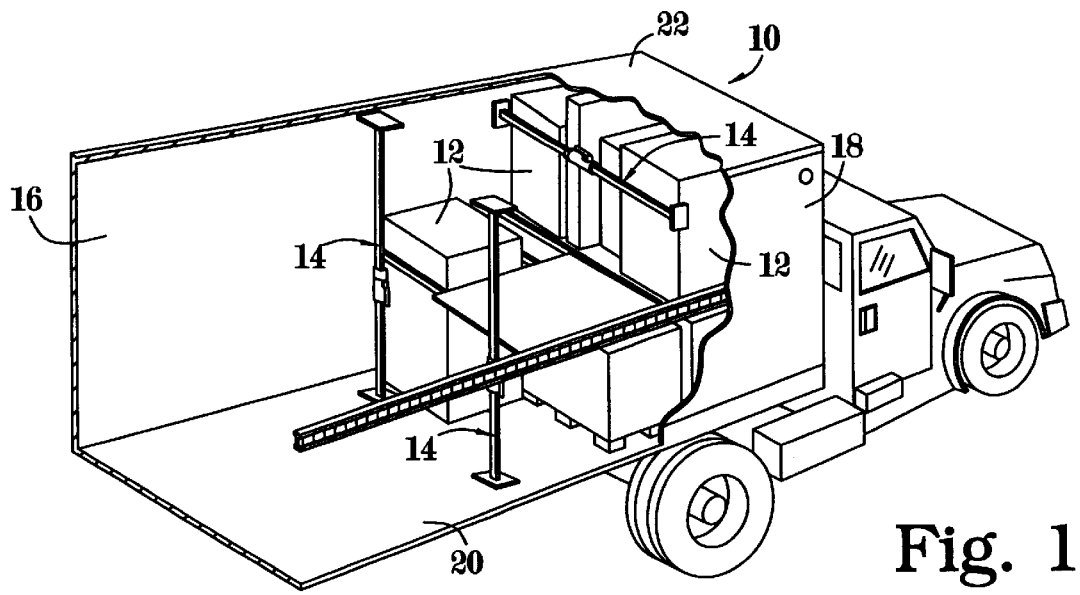
FIG. 1 is a fragmentary perspective view of a truck which is equipped with cargo bars constructed according to the present invention, with portions of the truck body broken away for purposes of illustration.
Figure 2:
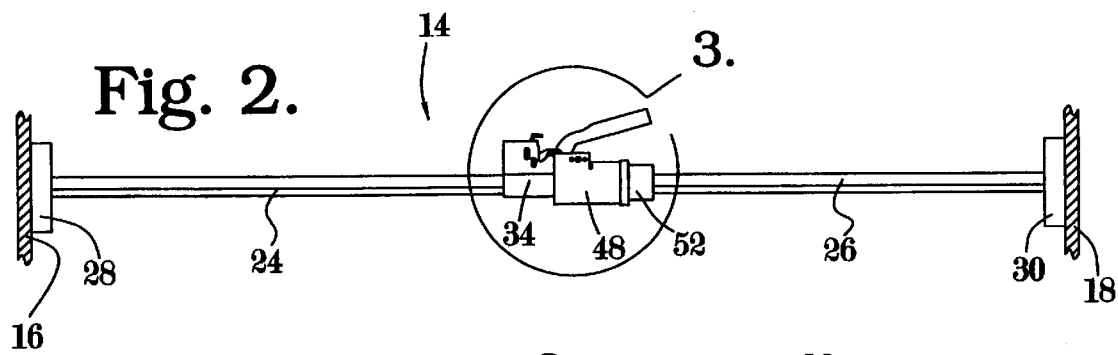
FIG. 2 is a fragmentary elevational view showing a cargo bar constructed according to one embodiment of the present invention extended between opposite walls of the truck body.

Referring now to the drawings in more detail and initially to FIG. 1, an over-the-road truck has a body 10 used to carry cargo such as boxes or crates 12. The crates 12 are restrained and held in place by one or more cargo bars 14 which may be extended between the opposite side walls 16 and 18 of the truck body 10 or between the floor 20 and ceiling 22 of the truck body. As shown additionally in FIG. 2, each of the cargo bars 14 includes a pair of separate bars 24 and 26 which carry pads 28 and 30, respectively, on their outer ends. The bars 24 and 26 are in line with one another. The pads 28 and 30 bear against the walls 16 and 18 (or the floor and ceiling) when the cargo bar 14 is in place.

With particular reference to FIGS. 3–6, the cargo bar 14 includes a ratchet mechanism which is generally identified by numeral 32 and which operates to extend bar 24. The ratchet mechanism includes a ratchet housing 34 from which bar 24 extends. The ratchet housing 34 is equipped with a conventional ratchet mechanism which includes a reciprocating handle 36 pivoted at 37 to the housing 34. The handle 36 operates a lever 38 which in turn cooperates with a pawl 40 and a leaf spring 42 (see FIG. 9). The pawl 40 engages teeth 44 (FIG. 5) which are formed in the upper face of the bar 24. With reference to FIG. 9 in particular, lever 38 is pivoted to the handle 36 by a pin 38a (FIG. 9). Pawl 40 is pivoted to handle 36 by pin 37. The pawl has a pin 40a to which one end of the leaf spring 42 is connected. The other end of the leaf spring 42 is connected with a small pin 38b (FIG. 9) carried on lever 38. Each time the handle 36 is reciprocated upwardly and downwardly, the pawl 40 interacts with one of the teeth 44 and pushes bar 24 to the left as viewed in FIGS. 2–5. This progressively extends bar 24 out of the ratchet housing 34 and progressively increases the overall length of the cargo bar 14 between the pads 28 and 30.

The ratchet mechanism 32 has a control lever 46 which interacts with the leaf spring 42 (by pressing against it or releasing it) to place the ratchet mechanism in an extension or retraction condition. In the extension position of lever 46, which is the position shown in the drawings, the lever 38 and pawl 40 are pushed downwardly by spring 42 in order to extend the bar 24 with each stroke of the reciprocating handle 36. The lever 46 can be pivoted from the position shown in the drawings to a release position in which the bar 24 can be retracted into the housing 34.

The details of the construction of the ratchet mechanism 32 are well known to those skilled in the art, and the ratchet mechanism may be one that is commercially available.

Figure 3:
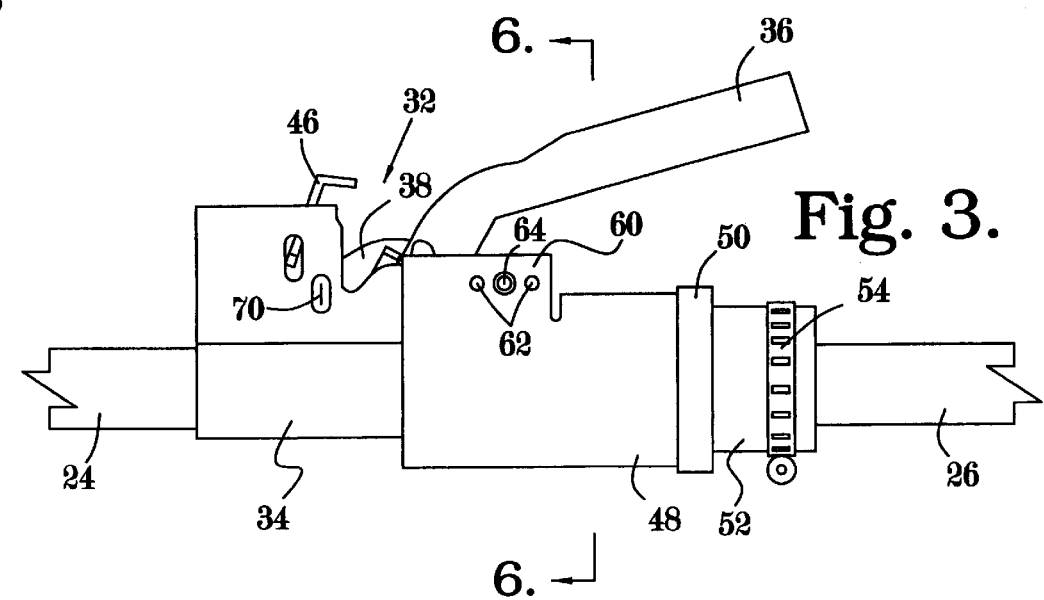
FIG. 3 is a fragmentary elevational view on an enlarge scale showing the detail identified by numeral 3 in FIG. 2.
Figure 4:
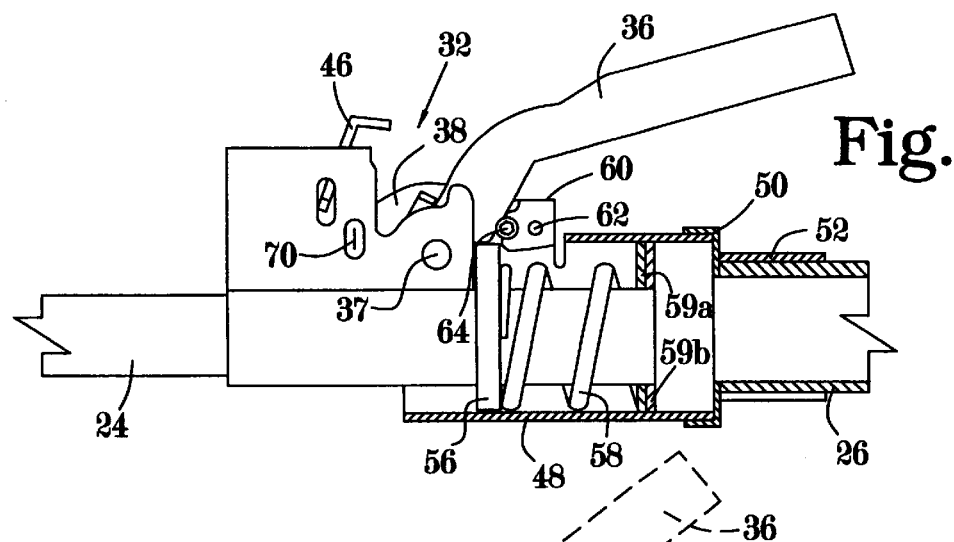
FIG. 4 is a fragmentary elevational view similar to FIG. 3 showing the cargo bar in a condition where the stop pin prevents further reciprocation of the ratchet handle included in the cargo bar, with portions broken away for purposes of illustration.
Figure 5:
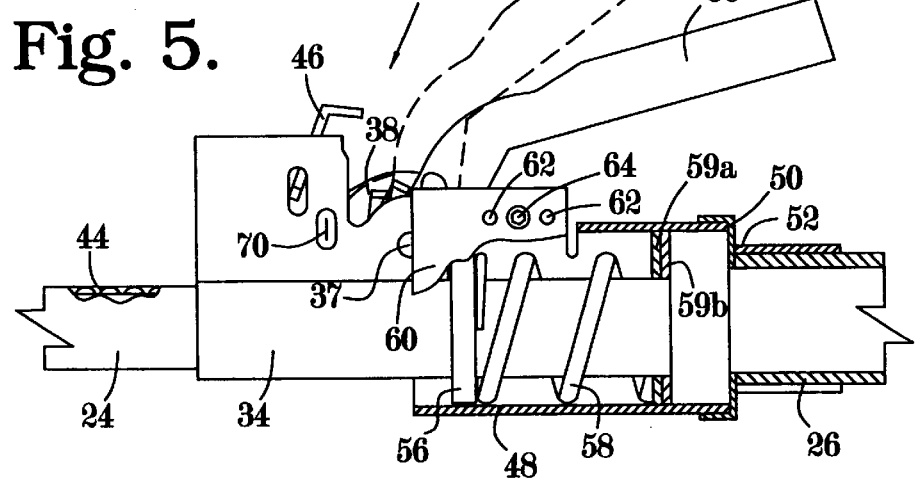
FIG. 5 is a fragmentary elevational view similar to FIG. 4, but showing the cargo bar in a condition where the stop pin does not interfere with operation of the ratchet handle.

With continued reference to FIGS. 3–5 in particular, the cargo bar of the present invention is equipped with a plunger which may include a barrel 48 having a flanged cap 50 on one end (the right end as viewed in FIGS. 3–5). The opposite or left end of the barrel 48 is open and partially receives the ratchet housing 34. A split sleeve 52 is secured to the end cap 50 and receives the end portion of the bar 26. As shown in FIG. 3, the bar 26 may be secured to the split sleeve 52 by tightening a band 54 around the sleeve to compress it onto the bar 26.

A disk 56 is secured to one end of the ratchet housing 34. The disk 56 has an opening which conforms in size and shape to the bar 24 so that bar 24 can extend through the disk 56 into barrel 48. Bar 24 may have a trapezoidal configuration to fit closely in the ratchet housing 34 (see FIG. 6 in particular). The other bar 26 may be cylindrical and is large enough to receive the end of bar 24 inside of it.

A compression spring 58 which is received inside of the barrel 48 acts against disk 56 at one end and against another disk 59a at the opposite end. Disk 59a is located adjacent to another disk 59b, and both of the disks 59a and 59b are secured to the barrel 48, as by welding. The spring 58 may connect the ratchet housing 34 with the barrel 48. The natural or undeformed condition of spring 58 is shown in FIG. 5. It is noted that the barrel 48 can move to the left relative to the ratchet housing 34 when compressive forces are applied to the ends of the cargo bar 14. This causes a compression of spring 58 which resists the movement of the barrel 48 to the left.

Figure 6:
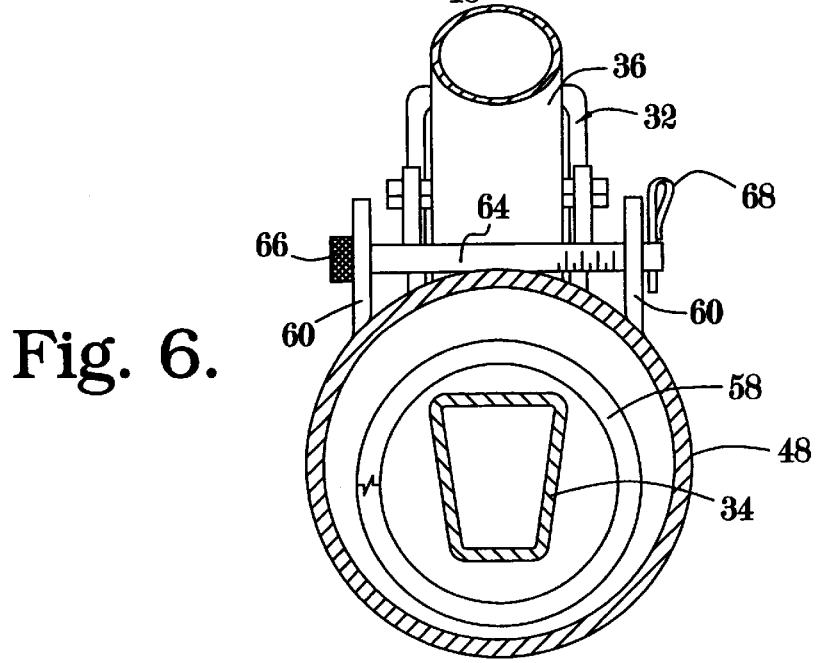
FIG. 6 is a fragmentary sectional view taken generally along line 6—6 of FIG. 3 in the direction of the arrows.

The barrel 48 is provided with a pair of bracket plates 60 which project generally upwardly from the left end of the barrel. The bracket plates 60 are provided with aligned sets of openings 62. Three sets of openings 62 may be provided, and the openings may be spaced apart in a straight row as shown in FIGS. 3 and 5 in particular. There may be more or fewer openings, and their particular location and arrangement may differ from what is shown in the drawings. A mechanical stop which limits the force that can be applied by the ratchet mechanism 32 may take the form of a pin 64. As shown in FIG. 6, the pin 64 is long enough to extend between the bracket plates 60 and through aligned pairs of openings 62 in the bracket plates. An enlarged head 66 is formed on one end of pin 64 and is too large to pass through the openings 62. A retaining pin 68 may be extended through the opposite end of the pin 64 in order to secure it in place in the selected openings 62 through which the pin is extended.

In use, the cargo bar 14 is extended between the opposite walls 16 and 18 of the truck body (or between the floor 20 and ceiling 22). In order to secure the cargo bar 14 in place, the ratchet handle is reciprocated to extend bar 24 and increase the overall length of the bar so that it is tightly wedged between the walls 16 and 18. Once the bar is fully extended between the walls 16 and 18, additional reciprocation of the ratchet handle 36 causes the barrel 48 to move to the left, thus carrying the bracket plates 60 with it. The spring 58 compresses with movement of barrel 48 to the left, and the compression of spring 58 provides a force opposing the movement of the barrel.

The pin 64 may be extended through whichever set of openings 62 is selected, depending upon the force limitation that is selected. Eventually, the barrel 48 will move to the left sufficiently to bring the pin 64 to a position where it physically interferes with additional reciprocation of the ratchet handle 36. This is the position shown in FIG. 4, and it is noted that the ratchet handle 36 cannot be reciprocated in order to effect additional extension of bar 24. The pin 64 engages the bottom of the handle 36 to prevent downward movement of the handle far enough to effect a stroke. The pin thus provides a stop for the ratchet handle The force that is applied to the walls 16 and 18 of the truck body is dependent upon the extent to which the spring 58 is compressed at the time the pin 64 is carried to a position where it prevents further reciprocation of the handle 36.

By way of example, the arrangement may be such that when the pin 64 is in the center set of openings 62 as shown in FIGS. 3–5, the spring 58 is compressed sufficiently to apply 300 pounds of force to the walls 16 and 18 at the time the pin 64 is moved to a position where it interferes with additional operation of the ratchet handle 36. If the pin 60 is positioned in the left set of holes 62 as viewed in FIGS. 3–5, the pin will interfere with handle 36 when the barrel has been moved to a lesser extent and the spring has thus been compressed to a lesser extent. 150 pounds of force may be applied to the walls at this time. Finally, when the pin 60 is inserted in the rightmost set of holes as viewed in FIGS. 3–5, spring 58 may be compressed such that it applies 450 pounds of force at the time the pin is moved to a position interfering with further operation of the ratchet handle 36.

It should be understood that these particular forces are merely exemplary and that the stop can be arranged to provide virtually any force limitation that is desired. It should also be noted that the pin 64 can be removed altogether and that there is then essentially no force limitation provided by the mechanism of the present invention.

In accordance with another aspect of the invention, the ratchet housing 34 is indented on its opposite sides to provide indentations 70 (only one of which is visible in FIGS. 3–5). The indentations 70 are located adjacent to the opposite sides of the lever 38 of the pawl mechanism and project inwardly from the opposite side walls of the ratchet housing 34.

The indentations 70 allow the cargo bar 14 to be used in a sideward orientation with the handle 36 projecting horizontally rather than vertically or upwardly as shown in the drawings. When the cargo bar is turned to a sideways position, the indentation 70 which is lowermost at the time engages the lever 38 and prevents the lever and the associated pawl 40 from falling downwardly against the wall of the ratchet housing 34 as would occur in the absence of the indentations. In this manner, the indentations 70 maintain the lever 38 and pawl 40 in a position where the working edge of the pawl can properly interact with the teeth 44. In prior art ratchet mechanisms that are not provided with indentations, the pawl 40 drops when the unit is turned sideways, and the pawl is located too far toward the edge of the bar 24 to properly interact with the teeth. The provision of the indentations 70 solves this problem and allows the cargo bar to be turned to a sideways orientation where the ratchet bar 36 is often more readily accessible. Because an indentation is provided on each side, the bar can be turned sideways with either side facing downwardly.

FIGS. 7–9 depict a second embodiment of the invention which is similar in many respects to the embodiment shown in FIGS. 1–6. The embodiment of FIGS. 7–9 includes a cylindrical ratchet housing 134 which, as best shown in FIG. 9, is provided with three slots 172 adjacent to its right end. The interior of the ratchet housing 134 is provided with a pair of guide disks 174 and 176 which are secured inside of the housing 134 and provided with openings 174a and 176a, respectively (see FIG. 9). The openings 174a and 176a have a size and a trapezoidal shape to closely receive bar 24 in extension through them.

The end of the other bar 26 is secured to another disk 178 which serves as the plunger of the force limiting mechanism. Disk 178 is provided with an opening 178a (FIG. 9 so that bar 24 can extend through the disk 178 when bar 24 is retracted into the cylindrical bar 26, as shown in FIG. 7.

As best shown in FIG. 9, disk 178 is provided on its periphery with three radially projecting ears or lugs 180 which extend through the slots 172 in the ratchet housing 134. The lug 180 which projects upwardly carries the bracket plates 60 which have the aligned sets of openings 62. The removable pin 64 can be inserted selectively through the openings 62 and secured by the retainer pin 68.

In the embodiment of FIGS. 7–9, the compression spring 58 is located inside of the cylindrical ratchet housing 134. One end of spring 58 acts against disk 176 and the opposite end of the spring 58 acts against disk 178. A tube 182 is secured to the slotted end of ratchet housing 134 and normally has its inner edge abutting disk 178. The opposite or outer end of tube 182 has an in turned annular lip 184 which provides a circular opening 186 through which bar 26 extends.

The embodiment of FIGS. 7–9 operates similarly to the embodiment of FIGS. 1–6. When the cargo bar has been extended between the opposite side walls of the truck body and the ratchet handle 36 is reciprocated additionally, the compressive force that is applied to the bars 24 and 26 causes the disk 178 to move to the left as viewed in FIG. 7 against the force of the compression spring 58. The ears 180 are able to travel in the slots 172, thus allowing the bracket plates 60 and the pin 64 to move to the left with disk 178. Again, the pin 64 may be extended through whichever set of slots 62 is selected, depending upon the maximum amount of force that is to be allowed. When the pin 64 has been moved far enough to prevent additional operation of the ratchet handle 36, the spring 58 is compressed sufficiently to provide the maximum allowed amount of force. Again, the amount of spring compression that is permitted is dependent upon the set of holes 62 that receive the pin 64.

FIG. 10 depicts a third embodiment of the invention which in most respects is similar to the embodiments previously described. In the FIG. 10 embodiment, a ratchet housing 234 has a sleeve 288 secured to it. A disk 276 is secured within the sleeve 288. The compression spring 58 bears against disk 276 at one end and against another disk 280 at the opposite end of the spring. The disk 280 fits slidably in one end of sleeve 288 and is connected with bar 26.

A tube 290 fits closely and slidably around sleeve 288. Sleeve 288 is slotted at 291 such that disk 280 connects with tube 290 by means of ears 292 on the disk 280 which project through slots 291. The bracket plates 60 are connected with the sliding tube 290.

The embodiment shown in FIG. 10 operates similarly to the other embodiments. When the ratchet handle 36 is reciprocated after the cargo bar has been fully extended between the opposite side walls of the truck body, the compressive force that is applied to the bars 24 and 26 causes disk 280 (which acts as the plunger) to retract into sleeve 288 against the force of the compression spring 58. The outer tube 290 and the bracket plates 60 move to the left with disk 280 and eventually bring the pin 64 into a position where it interferes with additional reciprocation of the ratchet handle 36. This prevents additional force from being applied by additional operation of the ratchet handle. Again, the limiting force is dependent upon which set of openings 62 receive the pin 64, as this determine the extent to which spring 58 is compressed at the point when further reciprocation of handle 36 is precluded by the pin 64.

The principal advantage of the construction depicted in FIG. 10 is a reduction in the length of the parts used to effect the force limiting feature of the present invention.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. A cargo bar assembly for restraining cargo in a vehicle body, comprising:
    first and second bars arranged in line between opposite ends of the cargo bar assembly;
    a ratchet housing from which said first bar extends;
    a ratchet mechanism having a handle pivoted to said ratchet housing for reciprocation to activate said ratchet mechanism in a manner to extend said first bar out of said ratchet housing;
    a plunger connected with said second bar;
    a compression spring acting between said ratchet housing and said plunger to allow compression of said plunger toward said housing upon application of compressive force to said opposite ends sufficient to compress said spring; and
    a stop movable with said plunger and situated to move therewith into a position preventing reciprocation of said handle when said spring has been compressed to a predetermined extent.

2. An assembly as set forth in claim 1, wherein the location of said stop is adjustable to vary said predetermined extent of spring compression in accordance with the location of said stop.

3. An assembly as set forth in claim 1, wherein:
    said stop comprises a pin element; and
    said plunger includes a bracket having plural openings for alternately receiving said pin element to vary said predetermined extent of spring compression in accordance with the opening that receives said pin element.

4. An assembly as set forth in claim 1, including a barrel on said plunger in which said ratchet housing is partially received.

5. An assembly as set forth in claim 1, wherein:
    said ratchet housing includes a barrel presenting a plurality of slots; and
    said plunger comprises a disk received in said barrel and including a plurality of ears projecting through said slots.

6. An assembly as set forth in claim 5, including a tube secured to said barrel and engageable with said disk.

7. An assembly as set forth in claim 6, including a guide opening in said tube through which said second bar closely extends.

8. An assembly as set forth in claim 1, wherein:
    said ratchet housing includes a projecting sleeve; and
    said plunger includes a tube fitted closely and slidably on said sleeve.

9. An assembly as set forth in claim 8, wherein said plunger includes a disk connected with said tube and slidably received in said sleeve, said spring acting against said disk.

10. An assembly as set forth in claim 9, wherein said sleeve includes a plurality of slots and said disk connects with said tube through said slots.

11. An assembly as set forth in claim 9, wherein:
    said stop comprises a pin element; and
    said tube carries a bracket having plural openings for alternately receiving said pin element to vary said predetermined extent of spring compression in accordance with the opening that receives said pin element.

12. An assembly as set forth in claim 5, wherein said stop comprises a pin element and a bracket connected with one of said ears, said bracket having plural openings for alternately receiving said pin element to vary said predetermined extent of spring compression in accordance with the opening that receives said pin element.

13. An assembly as set forth in claim 1, wherein:
    said ratchet housing includes a tubular portion; and
    said plunger comprises a disk slidably received in said tubular portion, said spring acting against said disk and said disk being connected with said stop.

14. An assembly as set forth in claim 13, wherein:
    said stop comprises a pin element; and
    said disk has a bracket connected thereto, said bracket having plural openings for alternately receiving said pin element to vary said predetermined extent of spring compression in accordance with the opening that receives said pin element.

15. A cargo bar assembly for restraining cargo, comprising:
    first and second bars arranged in line to extend between opposing surfaces;
    a ratchet housing from which said first bar extends;
    a ratchet mechanism in said ratchet housing, said mechanism including a reciprocating handle pivotal on said housing for actuation of said mechanism to extend said first bar progressively upon successive reciprocating strokes of said handle;
    a barrel interfitting with said ratchet housing, said second bar extending from said barrel;
    a compression spring acting between said ratchet housing and barrel to normally maintain said housing and barrel at established relative positions, said spring being compressible to allow said housing to retract toward said barrel when compressive force is applied to said bars; and
    a mechanical stop on said barrel located to interfere with reciprocation of said handle when said spring has been compressed to a predetermined extent.

16. An assembly as set forth in claim 15, wherein the location of said stop is adjustable to vary said predetermined extent of spring compression in accordance with the location of said stop.

17. An assembly as set forth in claim 15, wherein:

said stop comprises a pin element; and said barrel includes a bracket having plural openings for alternately receiving said pin element to vary said predetermined extent of spring compression in accordance with the opening that receives said pin element.

18. A cargo bar for restraining cargo, comprising:

a ratchet housing;

first and second bars extending from said ratchet housing in opposite directions, said first bar having a surface presenting teeth;

a ratchet assembly in said ratchet housing having a reciprocating handle and a pawl mechanism interacting with said teeth to progressively extend said first bar out of the ratchet housing in response to successive reciprocating strokes of said handle; and a projection comprising an indentation in said ratchet housing acting between said ratchet housing and pawl mechanism to maintain the pawl mechanism in position to interact with said teeth when said ratchet housing is in an orientation wherein said handle extends sidewardly therefrom.

19. A cargo bar as set forth in claim 18, wherein:

said ratchet housing has opposite sides; and said projection comprises an indentation in each of said sides.

\* \* \* \* \*